United States Patent
Min et al.

(10) Patent No.: US 7,742,288 B2
(45) Date of Patent: Jun. 22, 2010

(54) DISPLAY DEVICE

(75) Inventors: Kyung-hwan Min, Suwon-si (KR); Won-kyu Bang, Suwon-si (KR); Doo-young Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/055,237

(22) Filed: Mar. 25, 2008

(65) Prior Publication Data
US 2008/0239643 A1 Oct. 2, 2008

(30) Foreign Application Priority Data
Mar. 27, 2007 (KR) .................. 10-2007-0029837

(51) Int. Cl.
G06F 1/16 (2006.01)
H05K 5/00 (2006.01)
H05K 7/00 (2006.01)

(52) U.S. Cl. ............... 361/679.21; 361/679.22; 248/125.8; 313/582; 349/58

(58) Field of Classification Search .......... 361/681, 361/679.21, 679.22; 248/125.8, 371; 313/582; 349/58, 59, 60
See application file for complete search history.

(56) References Cited

U.S. PATENT DOCUMENTS

| 6,712,321 | B1 * | 3/2004 | Su et al. ............ 248/123.11 |
| 6,938,869 | B2 * | 9/2005 | Lin et al. ............ 248/414 |
| D530,333 | S * | 10/2006 | Richter ............ D14/447 |
| 7,159,828 | B1 * | 1/2007 | Yau et al. ............ 248/125.8 |
| 7,195,214 | B2 * | 3/2007 | Lee et al. ............ 248/125.8 |
| 7,268,999 | B2 * | 9/2007 | Kim ............ 361/679.27 |
| 2005/0050784 | A1 * | 3/2005 | Bang et al. ............ 40/607.01 |
| 2005/0051692 | A1 * | 3/2005 | Jung et al. ............ 248/371 |
| 2005/0264985 | A1 | 12/2005 | Kim et al. |
| 2006/0279189 | A1 | 12/2006 | Jeong |

FOREIGN PATENT DOCUMENTS

KR 10-2006-0036199 4/2006
KR 10-2007-0006450 1/2007

OTHER PUBLICATIONS

Korean Patent Abstracts, Publication 1020060036199 A, Published Apr. 28, 2006, for Kim.
KIPO Notice of Allowance, dated Oct. 29, 2008, for priority application KR 10-2007-0029837, noting reference listed in this IDS.

* cited by examiner

Primary Examiner—Jayprakash N Gandhi
Assistant Examiner—Adrian S Wilson
(74) Attorney, Agent, or Firm—Christie, Parker & Hale, LLP

(57) ABSTRACT

A display devise includes a display panel and a chassis base supporting the display panel. At least one reinforcing member is attached to the chassis base to add rigidity to the chassis base and at least one stand is attached to the chassis base to allow the chassis base to stand upright. A guide stand couples the reinforcing member to the stand, the guide stand comprising a body and a reinforcing plate substantially extending at an angle from the body.

11 Claims, 5 Drawing Sheets

DISPLAY DEVICE

CROSS-REFERENCE TO RELATED APPLICATIONS

This application claims priority to and the benefit of Korean Patent Application No. 10-2007-0029837, filed on Mar. 27, 2007, in the Korean Intellectual Property Office, the entire content of which is incorporated herein by reference.

BACKGROUND OF THE INVENTION

1. Field of the Invention

The present invention relates to a plasma display device, and more particularly to a plasma display device with a guide stand.

2. Discussion of Related Art

Referring to FIG. 1, a conventional plasma display device 100 includes a plasma display module 130 having a plasma display panel (PDP) 110 for displaying images using gas discharge and a chassis base 120 attached to the PDP 110 to support the PDP 110. After the chassis base 120 is attached to the PDP 110, circuit substrates (not shown) are mounted to the PDP for driving the PDP 110.

The chassis base 120 is made from a metal having good thermal conductivity, such as aluminum. Also, to provide additional support against deformation due to heat or the weight of the plasma display module 130, the chassis base 120 includes a plurality of reinforcing members 150 to add rigidity to the chassis base 120.

The plasma display device may include an upright means such as a stand 170, which allows the plasma display module 130 to stand upright, and a coupling member, such as a guide stand 160, which couples the stand 170 to the plasma display module 130.

Since the conventional guide stand 160 is typically made by a casting, such guide stands are relatively expensive to manufacture. Additionally, since many plasma display devices have a relatively large area, a center portion of the display device tends to sag when mounted on a stand. Accordingly, reinforcing structures have been used to improve rigidity of the chassis base. However, some PDP modules do not have sufficient space to allow the mounting of a conventional reinforcing structure thereto.

With reference now to FIG. 2, a rear substrate 12 of the PDP is attached to a chassis base 14 and includes a printed circuit substrate assembly 16 having various electronic components. A reinforcing member 13 is attached to the chassis base 14 to add rigidity to the chassis base 14 and a cable, such as a tape carrier package (TCP) 18, connects electrodes in a front substrate 11 and a rear substrate 12 to connection terminals in a substrate. When a gap between the TCPs 18 is relatively narrow, it is difficult to incorporate a conventional reinforcing structure. Additionally, if a separate reinforcing structure is needed, the cost of production increases.

SUMMARY OF THE INVENTION

A display device includes a display panel and a chassis base supporting the display panel. At least one reinforcing member is attached to the chassis base to add rigidity to the chassis base and at least one stand is attached to the chassis base to allow the chassis base to stand upright. A guide stand couples the reinforcing member to the stand, the guide stand comprising a body and a reinforcing plate substantially extending at an angle from the body.

The guide stand further may include a fixing flange for fixing the body to the reinforcing member. Additionally, a lower end of the integral reinforcing member may include a reinforcing plate. A cabinet may be attached to the display panel and the reinforcing plate may include at least one coupling hole coupled to the cabinet.

DETAILED DESCRIPTION

Figure 1:
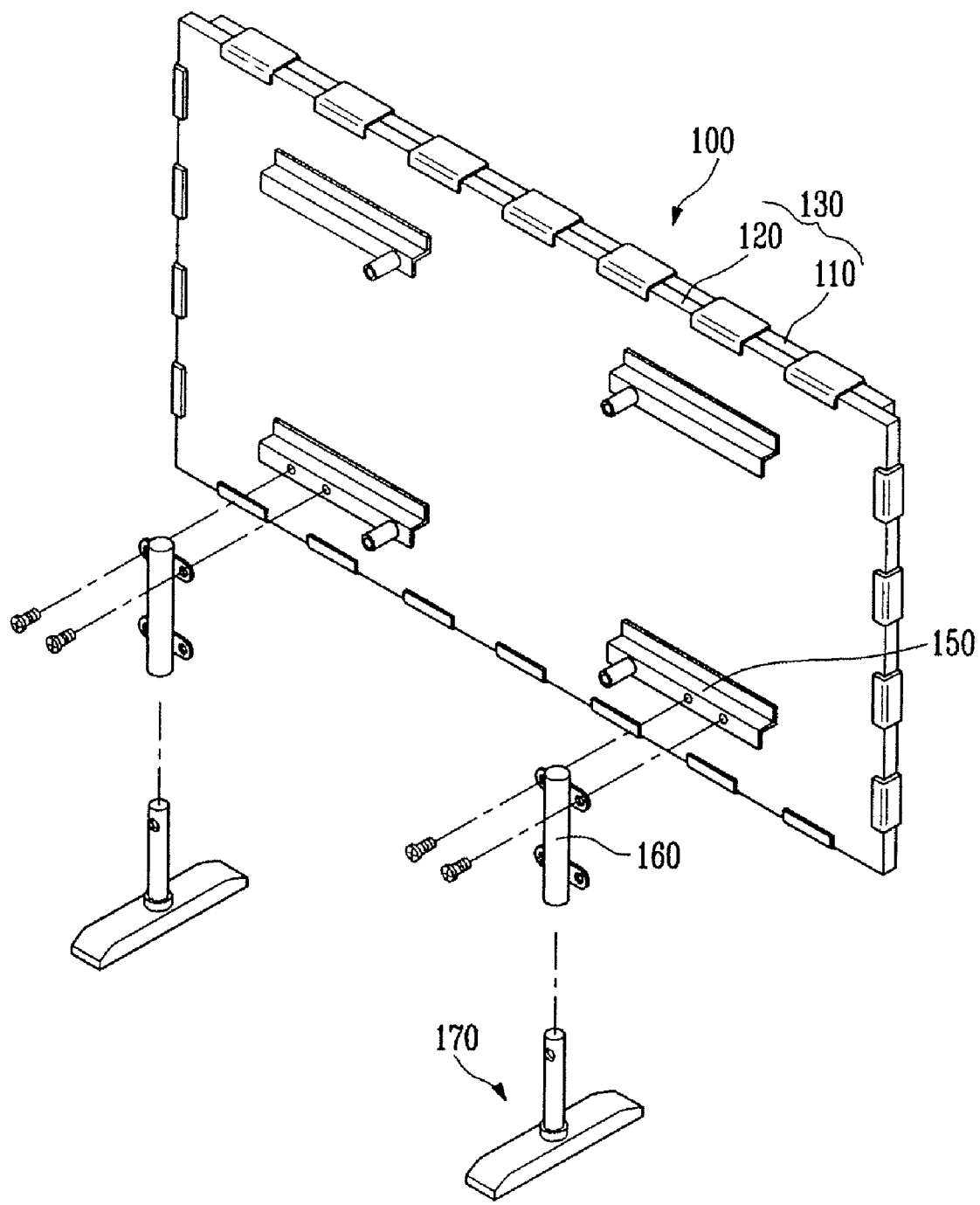
FIG. 1 is a partially exploded perspective view showing a conventional plasma display device using a guide stand.
Figure 2:
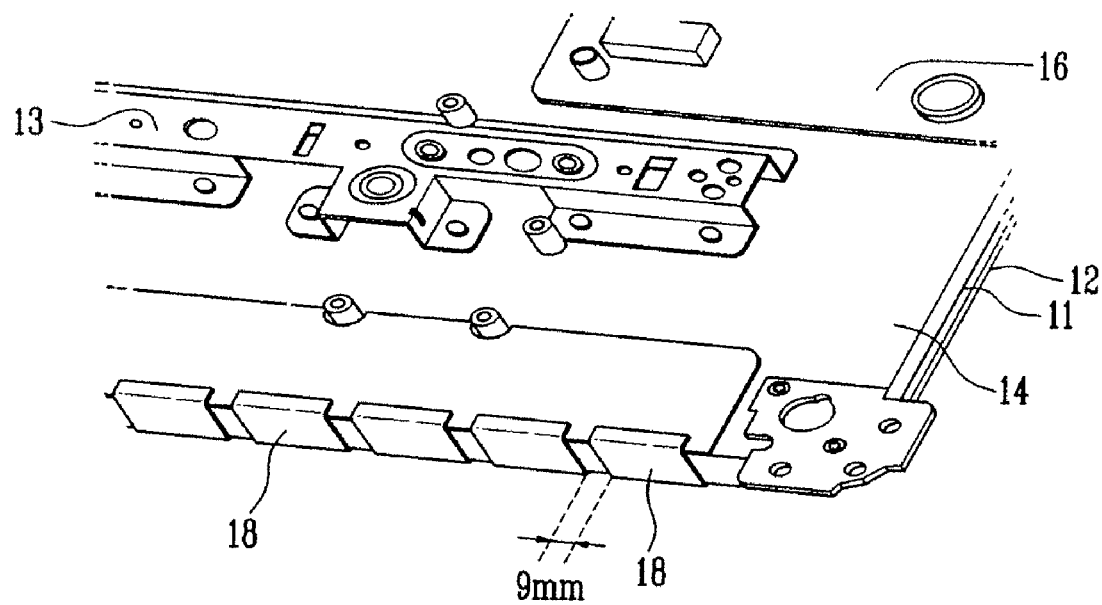
FIG. 2 is a partial perspective detail view of a plasma display device using a conventional TCP.
Figure 3A:
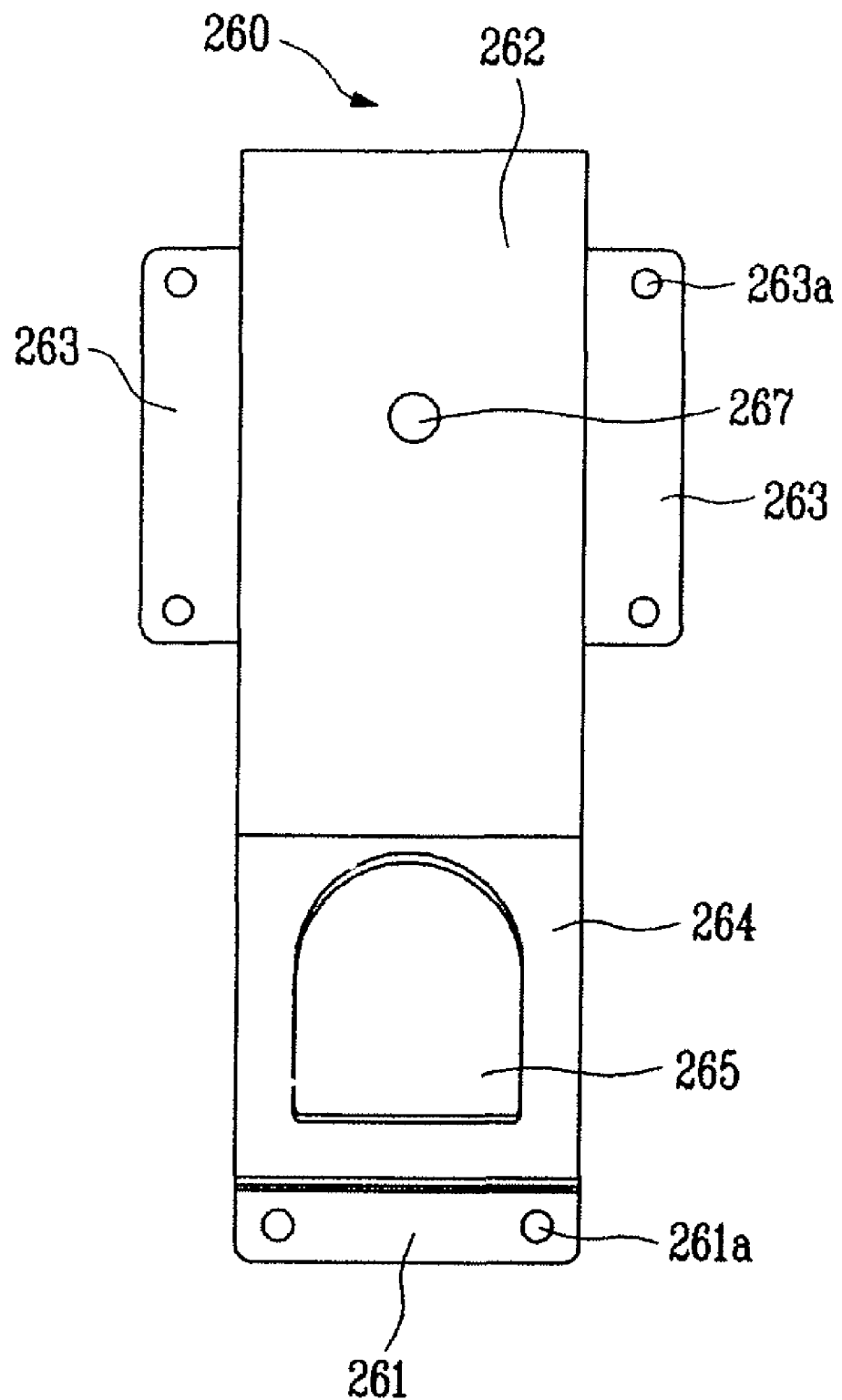
FIGS. 3A and 3B are a plan view and a side view showing a guide stand according to one embodiment of the present invention.
Figure 3B:
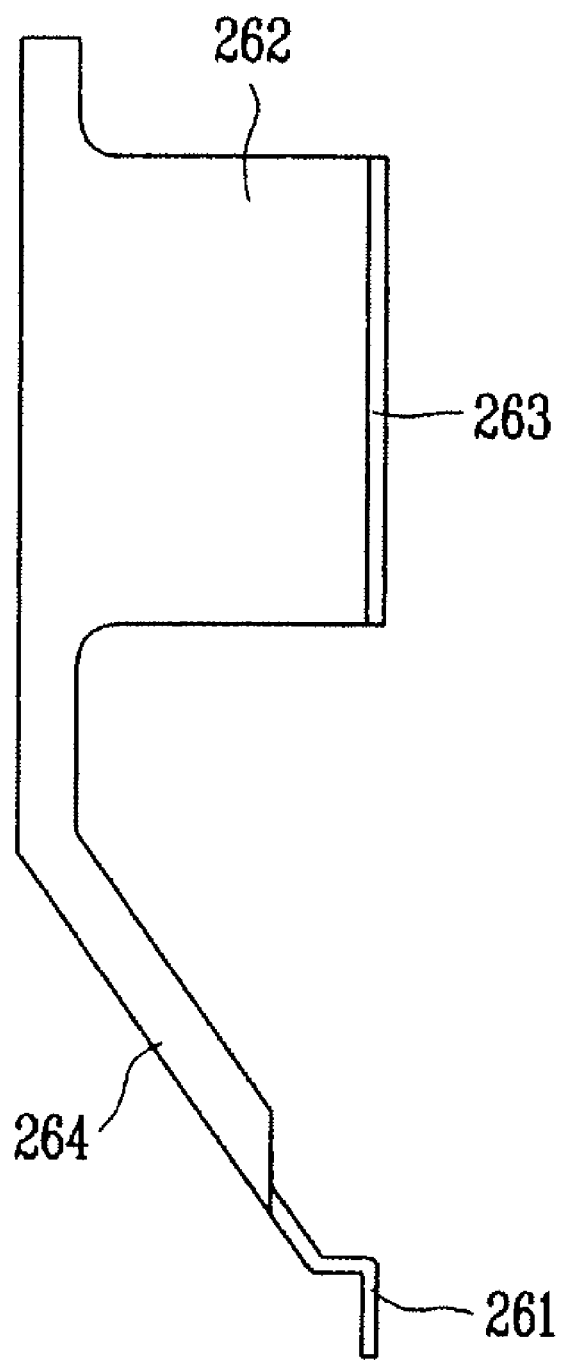
Figure 4:
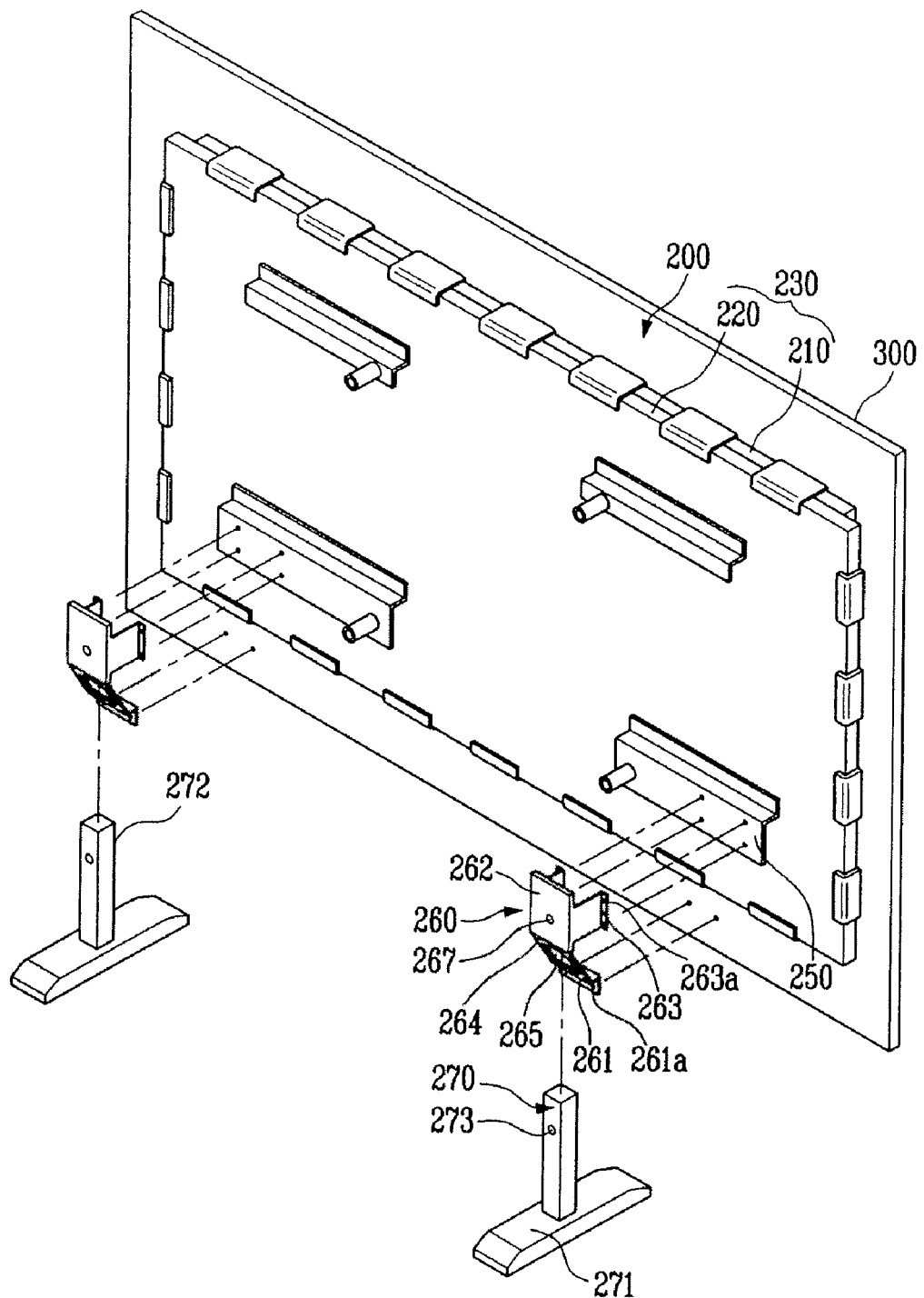
FIG. 4 is a partially exploded perspective view showing a plasma display device with a guide stand according to one embodiment of the present invention.

With reference to FIGS. 3A, 3B and 4, a plasma display device 200 according to an exemplary embodiment of the present invention includes a plasma display module 230. The plasma display module 230 includes a plasma display panel 210 for displaying images using gas discharge and a chassis base 220 attached to the plasma display panel 210 to support the plasma display panel 210. The display module 230 is assembled by coupling the chassis base 220 to the plasma display panel 210 and mounting circuit substrates (not shown) for driving the plasma display panel 210 to the chassis base 220.

The chassis base 220 supports the plasma display panel 210 and serves to discharge heat generated by the plasma display panel 210. As such, the chassis base 220 may be made from metal having good thermal conductivity, such as aluminum. Since the chassis base 220 may be deformed by the weight of the plasma display module 230 or by heat generated by the plasma display panel 210, the chassis base 220 includes a plurality of reinforcing members 250 to add rigidity to the chassis base 220.

As shown in FIG. 4, in one exemplary embodiment, four reinforcing members 250 are spaced on the rear surface of the chassis base 220, one reinforcing member being located approximately adjacent each corner. One of ordinary skill in the art will appreciate that more or fewer reinforcing members 250 may be used and may be spaced in many configurations on the chassis base 220 without departing from the spirit and scope of the invention.

The display device includes an upright mechanism, such as a stand 270, which allows the plasma display module 230 to stand upright. Additionally, a coupling member such as a guide stand 260, which couples the stand 270 to the plasma display module 230, is provided. The stand 270 includes a base 271 supporting the plasma display device 200 and an upright 272 integrally extending from the base 271. The upright 272 has a fixing groove 273 for coupling a stand fixing hole 267 thereto to attach the guide stand 260 to the stand 270. In one exemplary embodiment, the guide stand 260 is attached to and coupled to the reinforcing member 250 and is integral with an inclined portion 264 and the reinforcing plate 261 in an ear shape for maintaining the vertical rigidity of the module.

Since the reinforcing plate 261 is integrally formed with the guide stand 260, the reinforcing plate 261 can be installed even when the interval between TCPs is narrow.

The guide stand 260 according to an exemplary embodiment of the present invention has a body 262 adapted to allow the stand 270 to be inserted through a stand inserting hole 265 on the inclined portion 264 and a fixing flange 263 for fixing the body 262 to the reinforcing member 250. The inclined portion 264 may be coupled to the lower end of the body 262 at an angle. In this case, a lower end of the inclined portion 264 is integral with the reinforcing plate 261. As will be understood by one of ordinary skill in the art, the shape of the guide stand is not limited to the specific shape described above and many other shapes for the guide stand may be used.

Generally, the cross-section of the body 262 should be substantially compatible with the cross-section of the upright 272. For example, the body 262 may have a cross-sectional square "C" when viewed from above to be substantially compatible with a generally square cross-sectioned upright 272. On the other hand, if the upright 272 is cylindrical, the body 262 may have a cross-sectional arc shape to be substantially compatible with the cylindrical upright 272.

The fixing flange 263 may include at least one fastening hole 263a for coupling the guide stand 260 to the reinforcing member 250. The fixing flange 263 can be fastened to the reinforcing member 250 by a fastener, such as a screw or by a bolt and a nut. However, the present invention is not limited thereto. Also, the reinforcing plate 261 having at least one coupling hole 261a may be coupled to the cabinet 300 to vertically reinforce the panel.

Such a guide stand 260 is made by press working. In other words, unlike conventional guide stands made by a casting, the guide stand 260 includes the reinforcing plate 261 in a shape capable of being formed by press working a plate sheet, making it possible to significantly reduce manufacturing cost.

The plasma display device according to embodiments of the present invention as described above provides a guide stand integral with the reinforcing plate in an ear shape to prevent the center of the module from sagging, improving product reliability and quality. A separate reinforcing structure is not required, and the guide stand can be fabricated by press working, thus reducing manufacturing cost.

Although exemplary embodiments of the present invention have been shown and described, it will be appreciated by those skilled in the art that changes may be made to these embodiments without departing from the principles and spirit of the invention, the scope of which is defined in the claims and their equivalents. For example, while exemplary embodiments describe a plasma display panel, those skilled in the art will appreciate that the present invention is applicable to other display devices having flat panels.

What is claimed is:

1. A display device comprising:
    a display panel;
    a chassis base for supporting the display panel;
    a reinforcing member attached to the chassis base for supporting the chassis base;
    a stand attached to the chassis base for holding the chassis base upright; and
    a guide stand coupling the reinforcing member to the stand, the guide stand comprising a body having a hole through which the stand extends and a reinforcing plate substantially extending at an angle from the body,
    wherein the body and the reinforcing plate are a single integral structure.

2. The display device as claimed in claim 1, wherein the guide stand further comprises a fixing flange integral with the body fixing the guide stand to the reinforcing member.

3. The display device as claimed in claim 2, wherein the fixing flange extends from an edge of the body.

4. The display device as claimed in claim 2, further comprising a cabinet attached to the display panel and wherein the fixing flange includes at least one coupling hole for coupling the reinforcing plate to the cabinet.

5. The display device as claimed in claim 2, wherein the body has a generally square "C" cross-section.

6. The display device as claimed in claim 2, wherein the body has an arc cross-section.

7. The display device as claimed in claim 1, wherein the body includes a fastening hole, and wherein a fastener attaches the guide stand to the reinforcing member via the fastening hole.

8. The display device as claimed in claim 7, wherein the fastener is a screw or a nut and bolt.

9. The display device as claimed in claim 1, wherein the guide stand is press-worked.

10. The display device as claimed in claim 1, wherein the display device is a plasma display device.

11. The display device as claimed in claim 1, wherein the guide stand comprises a single sheet of material.

* * * * *